United States Patent
Walters

[11] Patent Number: 6,151,667
[45] Date of Patent: Nov. 21, 2000

[54] TELECOMMUNICATION DEVICE, MORE PARTICULARLY, MOBILE RADIO TERMINAL

[75] Inventor: Eckhard Walters, Röthenbach, Germany

[73] Assignee: U.S. Philips Corporation, New York, N.Y.

[21] Appl. No.: 08/931,396

[22] Filed: Sep. 16, 1997

[30] Foreign Application Priority Data

Sep. 21, 1996 [DE] Germany .................... 196 38 772

[51] Int. Cl.$^7$ ................................................ G06F 12/00
[52] U.S. Cl. .................... 711/211; 711/219; 455/115; 455/9
[58] Field of Search .................... 455/91, 115, 127, 455/343, 9; 364/232.7; 395/853; 371/10.2; 711/220, 1–6, 219, 211

[56] References Cited

U.S. PATENT DOCUMENTS

| | | | |
|---|---|---|---|
| 4,347,618 | 8/1982 | Kavouras et al. ......................... | 455/9 |
| 4,479,178 | 10/1984 | Schabowski ............................. | 364/200 |
| 4,484,261 | 11/1984 | Brantingham ........................... | 711/219 |
| 5,278,839 | 1/1994 | Matsumoto et al. .................... | 371/10.2 |
| 5,307,471 | 4/1994 | Ishikawa ................................. | 395/425 |
| 5,367,657 | 11/1994 | Khare et al. ............................. | 395/425 |
| 5,390,333 | 2/1995 | Pritt et al. ................................ | 711/211 |
| 5,440,299 | 8/1995 | Schwendeman ........................ | 455/343 |
| 5,812,559 | 9/1998 | Nakaide et al. ......................... | 711/211 |
| 5,892,978 | 4/1999 | Munguia et al. ........................ | 395/853 |
| 5,933,859 | 8/1999 | Klein ....................................... | 711/211 |

FOREIGN PATENT DOCUMENTS

| | | | |
|---|---|---|---|
| 0020908A1 | 1/1981 | European Pat. Off. ........ | G06F 13/00 |
| WO9528677 | 10/1995 | WIPO ............................. | G06F 12/02 |

*Primary Examiner*—Reinhard J. Eisenzopf
*Assistant Examiner*—Greta J. Fuller
*Attorney, Agent, or Firm*—Dicran Halajian

[57] ABSTRACT

A telecommunication device has a processor for processing data and a memory which stores the data. The memory is coupled to the processor by a data bus and an address bus. A first address counter provides an output address to the memory for reading out a desired data having the output address. A count of the first address counter is changed to a current address in response to a control signal from the processor, each time the processor generates a desired address. The current address is provided to the memory as the output address which is also the desired address. A comparator compares the desired address with the output address from a second address counter and outputs a load signal to the first counter when the current address from the second address counter differs from the desired address. The load signal loads the desired address in the first counter over the address bus when the current address differs from the desired address so that the output address is equal to the desired address. If the current address equals the desired address, then the desired address is provided to the memory as the output address from the first address counter without use of the address bus.

18 Claims, 1 Drawing Sheet

TELECOMMUNICATION DEVICE, MORE PARTICULARLY, MOBILE RADIO TERMINAL

BACKGROUND OF THE INVENTION

The invention relates to a telecommunication device, more particularly, a mobile radio terminal, comprising at least one processor for processing data, to which processor at least one data memory is assigned which is coupled to the processor via data and address lines of a bus system.

In processor-controlled telecommunication devices, processors and data memories are coupled to each other by bus systems which have a certain number of data lines and address lines depending on the system configuration. The bus systems also have control lines over which control signals are exchanged between the processors and the data memories. For example, microprocessors or signal processors are used as processors here. Examples for data memories used are RAM, ROM, EPROM and Flash EPROM. One processor may be assigned various data memories to which the processor has access. For loading data of a data memory, the respective processor applies addresses to the address lines of the bus system and transmits them to the data memory. The data memory then transmits the associated data over the data lines of the bus system to the processor. The addressing over the data lines of the bus system is effected at the cost of a power consumption that is considerable for many applications. The power consumption, especially in telecommunication devices using a battery or an accumulator as an energy source, is a critical magnitude (for example, for mobile terminals). Furthermore, the addressing over data bus address lines leads to certain minimum data memory access times of a processor, so that the speed with which the program runs can be carried out by the processor is restricted accordingly.

OBJECTS AND SUMMARY OF THE INVENTION

Therefore, it is an object of the invention to reduce the power consumption of the telecommunication device defined in the opening paragraph and at the same time reduce the data memory access times of the processor.

The object is achieved in that a first address counter is assigned to the data memory, in that the first address counter is used for delivering addresses to the data memory and in that means are provided which effect an initialization of the first address counter by a transmission of an address generated by the processor over the bus system to the first address counter in the case where an address generated by the first address counter differs from an address generated in parallel by the processor.

The first address counter produces the addresses necessary for addressing the data memory. The count of the first address counter and thus the address produced thereby are adapted to the address produced by the processor. The adaptation is effected by initialization of the address counter and subsequent change of the count. The address counter is to be initialized when there is a difference between two subsequent addresses produced by the processor, which difference exceeds an incrementation or decrementation step of the first counter, ie when there is an address jump. For the other address changes by the processor without such address jumps, which is usually the case for large parts of program runs, the address change may be made by simply adapting the count of the first address counter. The adaptation may be effected by transmitting a control signal of the processor address logic over a single control line to the first address counter. As an addressing over the address lines of the bus system is only necessary when the first address counter is initialized, the power consumption of the telecommunication device may be reduced, because addressing over parallel address lines is replaced by transmitting the control signal to the first address counter for incrementing and decrementing same and by supplying the address generated by the first address counter without utilizing the address lines of the bus system, which costs less power. Furthermore, the access time to the data memory is reduced, because generating new addresses by changing the count of the first address counter and addressing the data memory by the addresses thus generated by the first address counter requires less time than the conventional addressing over the address lines of the bus system of the telecommunication device. The increased processing speed may be further increased by a cache memory arranged in the processor.

In an embodiment of the invention, the processor is assigned a second address counter, and means are provided for the parallel initialization and parallel change of the counts of the first and second address counters.

With the second address counter, the processor has a means available with which it can simulate the count of the first address counter. Whether a transmission of an address to the first address counter over the address lines of the bus system is necessary may be established by evaluation of the second address counter in the processor, which thus leads to little circuitry and cost.

More particularly, a comparator unit is provided, which is used for comparing the addresses generated by the processor with the counts of the second address counter and causes the respective address generated by the processor to be loaded into the second address counter and over the bus system into the first address counter when a difference is found between two compared values. The comparator unit undertakes to make the comparisons and carry out control functions or transmitting an address to the first address counter. The addressing of the data memory can be carried out faster. The cost of hardware for realizing this embodiment is low.

A serial transmission of address data over the bus system to the first address counter makes it possible to save on address lines. However, this advantage is at the expense of more time for the transmission of the address over the bus system.

Preferably, on the one hand, the data memory and the first address counter and/or, on the other hand, also the processor, the second address counter and the comparator unit are arranged on one common chip, so that the arrangement of the telecommunication device according to the invention is realized cost effectively and with the fewest possible separate components when mass produced.

In another embodiment of the invention there is provided that the number of address lines of the bus system is smaller than the number of address bits per address, that a certain number of most significant address bits of an address are transmitted to the first address counter and that, subsequently, the count of the first address counter is changed via control signals generated by the processor logic so as to reconstruct the least significant address bits which have not been transmitted. The reduced number of address lines which are necessary for a more cost-effective realization of the bus system and for a reduced power consumption of the telecommunication device, the access time, however, increases by leaps and bounds, compared to the conventional devices which process the same address lengths. The reconstruction of the address bits not transmitted by address lines to the first address counter and thus to the data memory, by the change of the count of the first counter via control signals which may be transmitted over a single separate control line, however, is fast and needs only little control circuitry.

The invention likewise relates to a method of addressing a data memory by means of a processor which is coupled to the data memory via a bus system. The method implies that an address counter assigned to the data memory delivers addresses to the data memory and that, in the case where a current address generated by the address counter differs from an address generated in parallel by the processor, the address counter is initialized in that the current address generated by the processor is transmitted to the address counter over the bus system.

BRIEF DESCRIPTION OF THE DRAWINGS

Embodiments of the invention will be further explained in the following with reference to the drawing.

The FIGURE shows a telecommunication device according to the invention.

DETAILED DESCRIPTION OF THE PREFERRED EMBODIMENT

Figure 1:
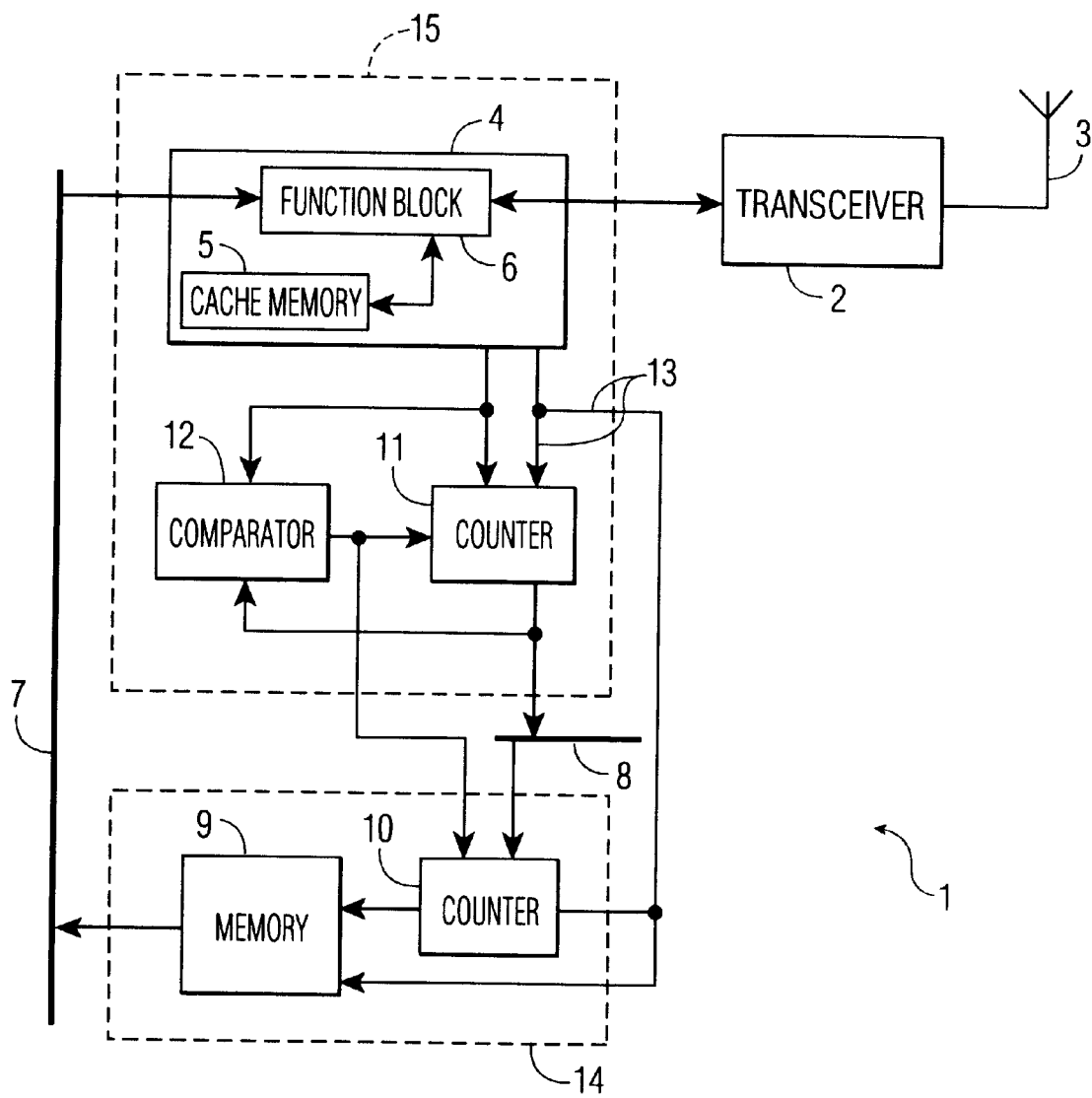

The telecommunication device 1 shown in the FIGURE is arranged here as a mobile radio terminal. It comprises a transceiver 2 to which a transceiver antenna 3 is connected. The transceiver 2 communicates with a processor 4 which may be arranged, for example, as a microprocessor or a signal processor. The processor 4 is used for processing receive signals received by the transceiver 2 and transmit signals transmitted by the transceiver 2. The processor represents a central controller controlling the functions of the telecommunication device 1 and includes a cache memory 5 which communicates with the further units of the processor 4 combined to a function block 6. The cache memory 5 is used as a buffer memory and accelerates in customary fashion the control functions and the signal/data processing of the processor 4. The program/cache memory allows of returns to the internal cash memory, without the necessity of accessing an external data memory 9 again.

The telecommunication device 1 includes a bus system formed by a data bus 7 and an address bus 8. They are shown in bold lines for clarity. The bus system further includes a control bus (not shown) over whose control lines the processor 4 exchanges control signals with other components of the telecommunication device.

The telecommunication device 1 includes a data memory 9 already mentioned, for storing data necessary for executing programs. For reading data, the data memory 9 is addressed by the processor 4, which will be further explained hereinafter. The telecommunication device 1 arranged as a mobile radio terminal comprises a plurality of processors, in this case a microprocessor and a signal processor. Furthermore, it includes here a plurality of data memories (RAM memory, EPROM memory and Flash EPROM memory). To represent the principle of the invention, however, it is sufficient to refer only to a single processor 4 and a single data memory 9. The data memory 9 is assigned a first address counter 10 whose counts are applied as addresses to the data memory 9. Processor 4 are assigned a second address counter 11 and a comparator unit 12 to which elements the processor 4 applies addresses in parallel. The comparator unit 12 compares the addresses generated by the processor with the respective count of the address counter 11. For the case where the count of the address counter 11 does not exactly match the address produced by the processor 4, the comparator unit 12 applies a control signal both to the second address counter 11 and to the first address counter 10, which control signal causes an address that has just been generated by the processor to be loaded into the two address counters 10 and 11 (initialization of the address counters 10 and 11). The address generated by the processor 4 is then loaded into the address counter 11 and converted into a respective count of the address counter 11. This address is loaded into the address counter 10 over the address bus 8. For this purpose, the output of the address counter 11 is in the present case coupled to the address bus 8, while the input of the address counter 10 is coupled to the address bus 8.

For all cases where the comparator unit 12 establishes that the address produced by the processor 4 matches the count of the address counter 11, this comparator unit neither effects an initialization of the address counters 10 and 11, nor a transmission of an address over the address bus as described above. This is always the case when two addresses generated successively by the processor do not imply a leap of address, ie the new address of a respective pair of addresses is the result of a simple incrementation or decrementation of the old address. For such cases which essentially occur more frequently than program leaps in program runs, the address counter 10 simulates the generation of an address by the processor 4, ie its count correctly shows the address generated by the processor 4. The same holds for the address counter 11. For this purpose, the address counters 10 and 11 are supplied with a control signal over a control line 13 each time an address is generated by the processor 4, which control signal causes the address counters 10 and 11 to increment or decrement. A control signal applied to the address counters 10 and 11 over the control line 13 is at the same time applied to the data memory 9, so that a data word belonging to the address produced by the address counter 10 is read out and this data word is transmitted by the data bus 7 to the processor 4, which further processes the transmitted data word.

With the present invention, the power consumption of the telecommunication device 1, which power consumption is determined by the addressing of the data memory 9, can be reduced, because the data memory 9 is only addressed over the address bus 8 when the address counters 10 and 11 are initialized. For the further addressings of the data memory 9, the address bus is not used and the address lines may remain deactivated and save energy. Similarly, the access times to the data memory 9 are reduced, because when addressing takes place without the use of address bus 8, the customary address control measures, for controlling the transmission of addresses by the address bus 8, may be omitted.

A further embodiment of the invention may be provided in that the number of address lines of the address bus 8 are reduced. The number of address lines are then smaller than the number of address bits per address word. When the address counters 10 and 11 are initialized, a predefined number of most significant address bits are transmitted over the address bus 8. For reconstructing the least significant and not transmitted address bits of an address with which the address counters 10 and 11 are to be initialized, there is thus provided that control signals generated by the processor 4 are transmitted to the address counters 10 and 11 over the control line 13, which control signals cause incrementation and decrementation steps to be effected in accordance with the desired address with which the address counters 10 and 11 are to be initialized. The control signals used are then bordered by two control signals which control the data memory 9 in such a way that data are not read from the data memory 9 during the reconstruction of the least significant address bits. The reduced number of address lines only leads to an accordingly reduced number of connections via which address bits are applied to the address bus or via which address bits transmitted over the address bus 8 are received. Preferably, the data memory 9 and the address counter 10 are arranged on a common chip 14. Particularly, the processor 4, the address counter 11 and the comparator unit 12 form part of a common chip 15. The expenditure and hardware for realizing the address counters 10 and 11 and the comparator unit 12 are then reduced especially when the telecommunication device 1 is mass produced. In addition, with a reduced number of address lines, the chips 14 and 15 may be realized in a more compact way because of a reduced number of pins, so that their required space is reduced.

What is claimed is:

1. A telecommunication device comprising:
a processor for processing data;
a memory which stores said data and is coupled to said processor by a data bus and an address bus;
a first address counter which provides an output address to said memory for reading out a desired data having said output address;
a count of said first address counter being changed to a current address each time said processor generates a desired address, said current address being provided to said memory as said output address;
wherein said first address counter is loaded with said desired address provided over said address bus when said current address differs from said desired address so that said output address is equal to said desired address.

2. The telecommunication device of claim 1, wherein said count of said first address counter is changed to said current address in response to a control signal from said processor.

3. The telecommunication device of claim 1, wherein said count of said first address counter is changed to said current address each time said processor generates said desired address without use of said address bus, said current address being provided to said memory as said output address when said current address equals said desired address.

4. The telecommunication device of claim 1, further comprising a comparator which compares said desired address with said output address and outputs a load signal to said first address counter when said current address differs from said desired address, said load signal loading said desired address in said first address counter over said address bus.

5. The telecommunication device of claim 1, further comprising:
a second address counter which outputs said current address; and
a comparator which compares said desired address with said output address from said second address counter and outputs a load signal to said first address counter when said current address from said second address counter differs from said desired address, said load signal loading said desired address in said first address counter over said address bus.

6. The telecommunication device of claim 1, wherein said desired address is serially transmitted over said data bus to said first address counter.

7. The telecommunication device of claim 1, wherein said memory and said first address counter are arranged on a common chip.

8. The telecommunication device of claim 1, wherein a number of said address lines of said data bus is smaller than a number of address bits per said desired address; and wherein a predetermined number of most significant address bits of said desired address are transmitted to said first address counter, a change of said count of said first address counter being effected via control signals from said processor to reconstruct remaining bits of said desired address which have not been transmitted to said first address counter.

9. A processing device comprising:
a processor for processing data and providing a desired address of a desired data;
a memory which is coupled to said processor by a data bus;
a first address counter which provides an output address to said memory for reading out said desired data having said output address;
said output address being a count of said first address counter, said count being one of a changed count in response to a control signal from said processor which bypasses an address bus and a loaded count from said processor provided over said address bus when said changed count is different from said desired address.

10. The telecommunication device of claim 9, wherein said changed count is changed each time said processor generates said desired address.

11. The telecommunication device of claim 9, wherein said changed count is provided to said memory as said output address from said first address counter without use of said address bus when said changed count matches said desired address.

12. The telecommunication device of claim 9, further comprising a comparator which compares said desired address with said output address and outputs a load signal to said first address counter when said current address differs from said desired address, said load signal loading said desired address in said first address counter over said address bus.

13. The telecommunication device of claim 9, further comprising:
a second address counter which outputs said current address; and
a comparator which compares said desired address with said output address from said second address counter and outputs a load signal to said first address counter when said current address from said second address counter differs from said desired address, said load signal loading said desired address in said first address counter over said address bus.

14. The telecommunication device of claim 9, wherein said desired address is serially transmitted over said data bus to said first address counter.

15. The telecommunication device of claim 9, wherein said memory and said first address counter are arranged on a common chip.

16. The telecommunication device of claim 9, wherein a number of said address lines of said data bus is smaller than a number of address bits per said desired address; and wherein a predetermined number of most significant address bits of said desired address are transmitted to said first address counter, a change of said count of said first address counter being effected via control signals from said processor to reconstruct remaining bits of said desired address which have not been transmitted to said first address counter.

17. A method of reading data from a memory comprising:

providing a desired address of said data from a processor;

changing a current address of a counter in response to a control signal from said processor each time said processor generates said desired address;

loading said counter with said desired address provided from said processor over an address bus when said current address of said counter is different from said desired address, wherein said control signal from said processor bypasses said address bus; and providing said current address to said memory for reading said data.

18. The method of claim 17, further comprising comparing said desired address with said current address.

* * * * *